Feb. 4, 1930.  W. E. HOBBS  1,745,538
AUTOMOBILE CONVERTIBLE SEAT ARRANGEMENT
Filed Sept. 6, 1928  2 Sheets-Sheet 2
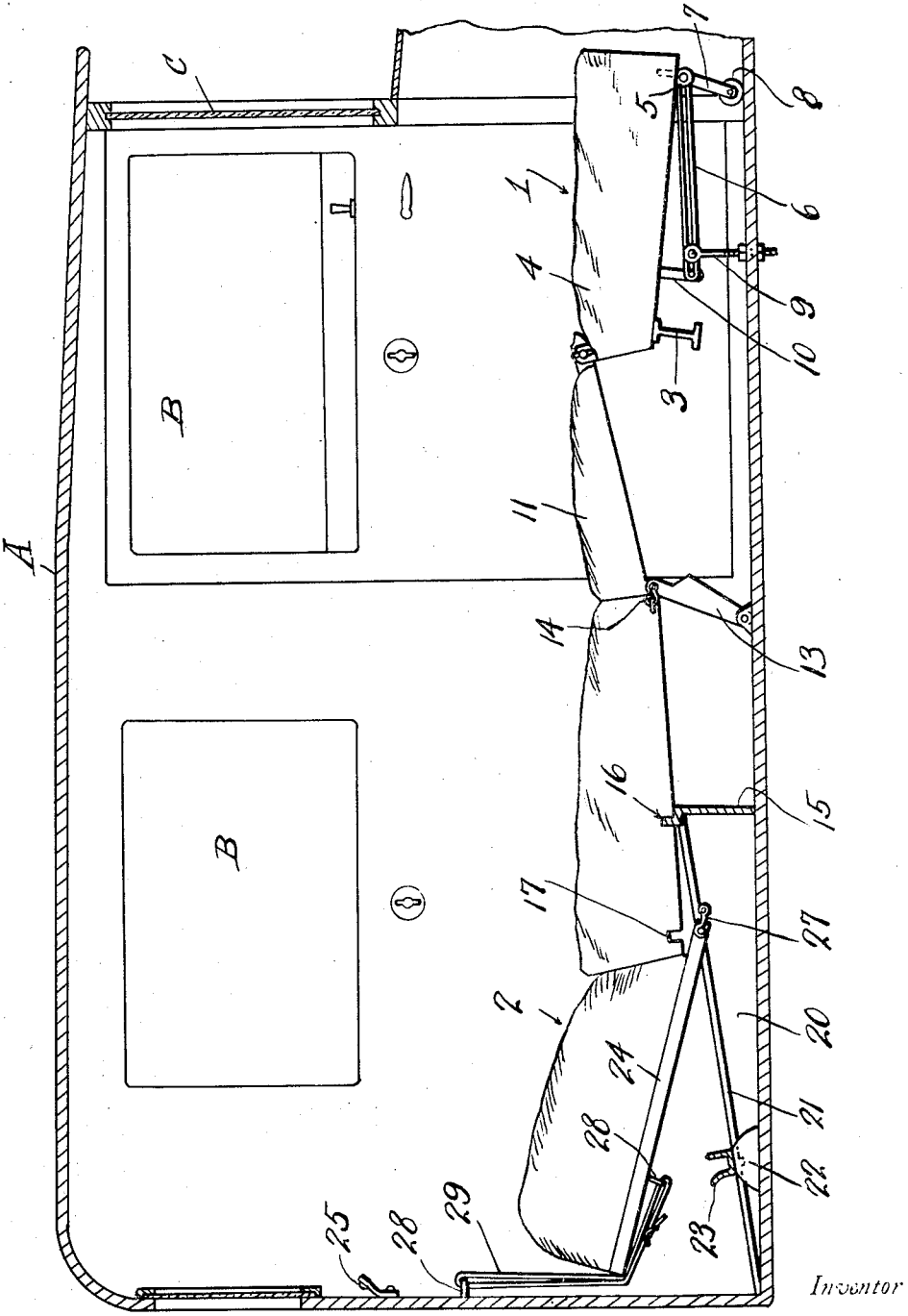
Inventor
William E. Hobbs
By Clarence A. O'Brien
Attorney Patented Feb. 4, 1930

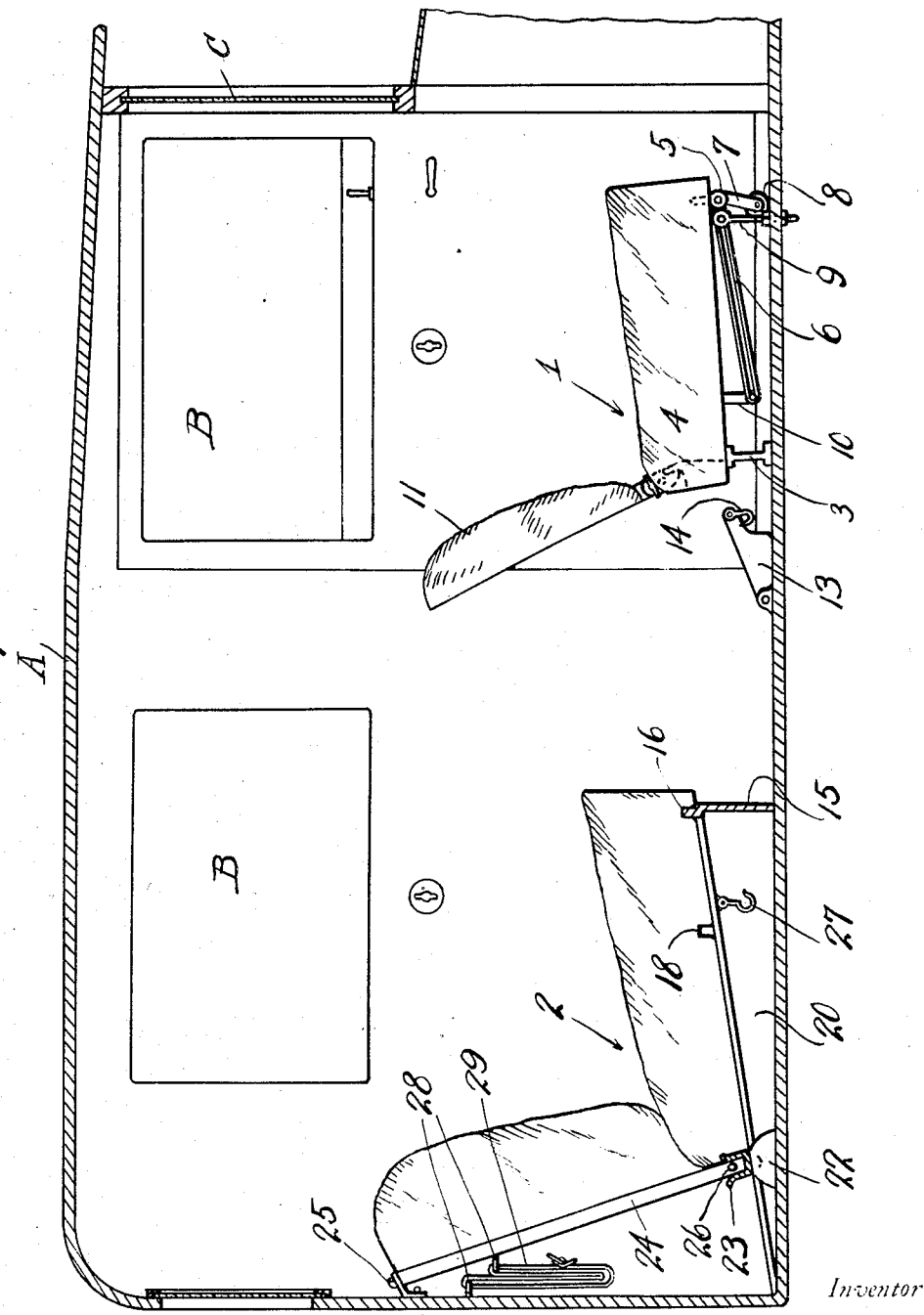

1,745,538

UNITED STATES PATENT OFFICE

WILLIAM E. HOBBS, OF CLINTON, NORTH CAROLINA

AUTOMOBILE CONVERTIBLE-SEAT ARRANGEMENT

Application filed September 6, 1928. Serial No. 304,266.

The present invention pertains to improvements in seat arrangements for automobiles, wherein the seats may be quickly adjusted to convert them into use as a bed.

Numerous efforts have been made with this end in view, but due to the cumbersome means generally employed, this type of seat for automobiles, has not become popular.

The prime object of this invention resides in the provision of convertible seats for automobiles, wherein the seat and back sections of both the front and rear seats may be adjusted to a position in substantially horizontal planes.

Another important object of the invention is accomplished by a means whereby the front seat may be shifted forwardly in order to utilize the back space of the vehicle immediately below the usual instrument board.

Still another object resides in the special means employed for supporting the rear seat back section in a position whereby bed clothes may be obtained from a compartment located thereunder without any inconvenience.

After reading the following specification and claim, other important objects and advantages of this invention will become apparent.

In the drawings:

Figure 1 represents a longitudinal sectional view through the conventional automobile of the usual coach type and showing the novel seat structures in their normal upright positions for use as seats, and Figure 2 is a longitudinal sectional view through an automobile body of the same type, and showing the several seat sections disposed in substantially a horizontal plane for use as a bed.

Referring to the drawings, wherein like numerals designate like parts, an automobile body designated by A includes the usual windows B, and windshield C. The elements are shown in the drawings in side elevation, and may be used in suitable numbers without affecting the spirit and scope of this invention.

Within the automobile body front and rear seat structures are generally referred to by numerals 1 and 2 respectively. Beneath the front seat structure an I beam 3 is secured transversely across the floor of the vehicle for supporting the rear portion of the seat cushion 4.

An eye screw secured to the bottom of the cushion at its forward corners serves to support one end of a slotted guide bar 6 and has connected thereto a depending member 7 for journally supporting a roller 8, the roller being adapted to ride on the surface of the floor of the vehicle.

An eye bolt 9 secured at its threaded end to the vehicle floor has a suitable means for slidably connecting the eye portion thereof to the guide bar 6, through the slot therein. The opposite end of the guide bar is connected in spaced relation to the seat cushion by a spacing member 10.

The front seat section 11 is pivotally connected to the rear portion of the seat cushion 4 so that by leaning it forward and lifting it up, the same may be swung rearwardly to a position substantially shown in Figure 2.

A pivotal foot rest 13 is provided with a foot member 14, at its outer end. This foot rest is adapted to be swung to a position to bear against the upper rear side portion of the seat back 11.

The rear seat structure 2 is provided with the usual seat cushion supporting wall 15. This wall is provided with an offset and upstanding flange 16, at its upper portion and this normally engages in the groove 17 of the cushion bottom as is clearly shown in Figure 1.

By reversing the position of the rear seat cushion, the upstanding flange 15 will engage in an intermediate groove 18 of the seat cushion when the cushion is arranged in the forwardly projecting position as shown in Figure 2. In this position, the foot member 14 on the foot rest engages in an eyelet 19 on the rear portion of the rear seat cushion. The rear seat supporting wall 15 is also provided with rearwardly sloping side walls 20 which are provided with inwardly disposed flanges 21 at their upper edges. A transversely disposed pillow 22 has secured thereon a U-shaped bar 23, within which the depending portion of the backboard of the rear seat back section rests when the back section is in upright position. When the seat is in this upright position, a fastener 25 carried by the back wall of the vehicle is engageable with the upper end of the back board to maintain the same in proper position. The back board is provided with a protuberance 26, engageable by the hook member on the side wall 20 when the same is shifted forwardly to the inclined position shown in Figure 2. For supporting the upper end of the rear seat back section in this inclined manner, the rear wall of the vehicle and the rear side of the back board 24 are provided with eye members 28—28, and a strip member is connected between these eye members and serves to support the upper end of the back section in the position and manner shown in Figure 2.

In converting the front and rear seats from their positions shown in Figure 1 to the position shown in Figure 2, the front seat cushion 4 is simply shifted forwardly. The rear end portion of the cushion will be elevated through this movement by reason of the engagement of the guide bar 6 with the eye bolt 9. After the front cushion has been shifted to the position shown in Figure 2, the back section complementary thereto is swung rearwardly and is supported in a substantially horizontal position by the upstanding position of the foot rest 13. The rear cushion is then reversed in the manner aforementioned and connected to the foot rest 13 by the hook member. The rear seat back section may then be lifted so that the back board 24 will be disengaged from the U-bar 23. The same may then be shifted to the inclined position shown in Figure 2 and in this position supported by the strap 29 and retained by the hook member 27.

It is to be understood that certain changes in the specific shape, size and materials may be resorted to, without departing from the spirit of the invention or the scope of the appended claim.

Having thus described my invention, what is claimed as new is:

In a convertible seat arrangement for vehicles wherein the front seat structure is collapsible to form a portion of a bed; the rear seat structure for forming the remaining portion of the bed, said rear seat structure comprising a bottom section and a back section, a pair of forwardly inclining walls upon which the bottom section is normally supported, a cross member at the forward ends of the walls, said bottom section being provided with a groove on the bottom side thereof for receiving the cross member when the bottom section is in a forwardly shifted position, and a sling structure for supporting the back section in forwardly declining position with its forward edge portion abutting the rearward edge portion of the bottom section.

In testimony whereof I affix my signature.

WILLIAM E. HOBBS.